United States Patent [19]
Saito

[11] Patent Number: 5,604,795
[45] Date of Patent: Feb. 18, 1997

[54] COMMUNICATION METHOD AND APPARATUS FOR PROVIDING TERMINAL INFORMATION TO A LINE CONNECTED TO PLURAL NETWORKS

[75] Inventor: Toshiaki Saito, Hatogaya, Japan

[73] Assignee: Canon Kabushiki Kaisha, Tokyo, Japan

[21] Appl. No.: 159,519

[22] Filed: Dec. 1, 1993

[30] Foreign Application Priority Data

Dec. 11, 1992 [JP] Japan .................................. 4-353022

[51] Int. Cl.[6] .............................................. H04M 11/00
[52] U.S. Cl. .......................................... 379/100; 358/440
[58] Field of Search ................................ 379/100, 96, 93, 379/94, 156, 157, 158, 159, 160, 164, 165, 167, 171, 172, 173; 358/440, 434, 435, 436, 438, 439, 442, 443, 444, 401, 400

[56] References Cited

U.S. PATENT DOCUMENTS 4,961,185 10/1990 Sawada .................................. 379/100
5,151,933 9/1992 Abe ....................................... 379/159
5,200,992 4/1993 Yoshino ................................ 379/100
5,204,895 4/1993 Yoshiura ............................... 379/100
5,267,307 11/1993 Izumi et al. .
5,276,687 1/1994 Miyamoto ............................... 379/94
5,367,564 11/1994 Sutoh et al. ........................... 379/100
5,381,240 1/1995 Murayama ............................. 358/436

FOREIGN PATENT DOCUMENTS

5276348 10/1993 Japan ............................... H04N 1/32

Primary Examiner—Stella Woo
Attorney, Agent, or Firm—Fitzpatrick, Cella, Harper & Scinto

[57] ABSTRACT

A communicating apparatus connected to an extension line of a private branch exchange (PBX) network comprises: a judging unit to judge whether a call was performed to an external line of the PBX network or a call was executed to an extension terminal; and a transmission unit to transmit terminal information according to the result of the judgment by the judging unit through the extension line. The terminal information includes a calling party number in an SETUP command. The transmission unit transmits the terminal information in a G4 facsimile procedure.

14 Claims, 8 Drawing Sheets

| | NUMBER OF PLACES | DATA CONTENTS |
|---|---|---|
| OWN TERMINAL NUMBER FOR EXTENSION | 04 | "3005" |
| OWN TERMINAL NUMBER FOR EXTERNAL LINE | 08 | "54824000" |
| EXTERNAL LINE TRANSMISSION NUMBER | 01 | "0" |
| OWN TERMINAL NAME FOR EXTENSION | 08 | "Personnel Section" |
| OWN TERMINAL NAME FOR EXTERNAL LINE | 05 | "ABC Inc." |

COMMUNICATION TERMINAL ID : 081 - 54824000 - 3005 = ABC Inc. - Personnel Section

COMMUNICATION METHOD AND APPARATUS FOR PROVIDING TERMINAL INFORMATION TO A LINE CONNECTED TO PLURAL NETWORKS

BACKGROUND OF THE INVENTION

1. Field of the Invention

The invention relates to a communicating apparatus for transmitting terminal information indicative of an own terminal.

2. Related Background Art

In a facsimile apparatus or an ISDN telephone, own terminal information can be registered.

However, in the communication (speech communication) between the extension terminals and the communication (speech communication) with an external line terminal, the own terminal information which is notified to a partner terminal is the same. For example, in the case where the registered terminal information is the information for extension, in the communication with the external line terminal, there is a case where the terminal information which is notified to the partner terminal or ISDN network is illegal and the communication cannot be performed. On the other hand, there is also a case where information which cannot be understood for the partner user remains as communication management information (communication management report, header to the received document, and the like) of the partner terminal, thereby causing a confusion of the user.

SUMMARY OF THE INVENTION

It is an object of the invention to solve the above problems.

Another object of the invention is to provide a communicating apparatus which can transmit proper terminal information.

Still another object of the invention is to provide a communicating apparatus which can transmit proper terminal information to the side to be called even in case of performing a call to an external line of a private network or even in case of performing a call to an extension terminal.

Further another object of the invention is to provide a communicating apparatus for receiving numeral information of a plurality of digits from a communication line and for transmitting terminal information according to the numerical value information of each digit of the numeral information of a plurality of digits received.

Further another object of the invention is to provide a communicating apparatus for transmitting proper terminal information in accordance with the result regarding whether the calling side performed a call by using the number for extension of a private network or the calling side performed a call by using the number for external line when a call is received.

The above and other objects and features of the present invention will become apparent from the following detailed description and the appended claims with reference to the accompanying drawings.

DETAILED DESCRIPTION OF THE PREFERRED EMBODIMENTS

Figure 1:
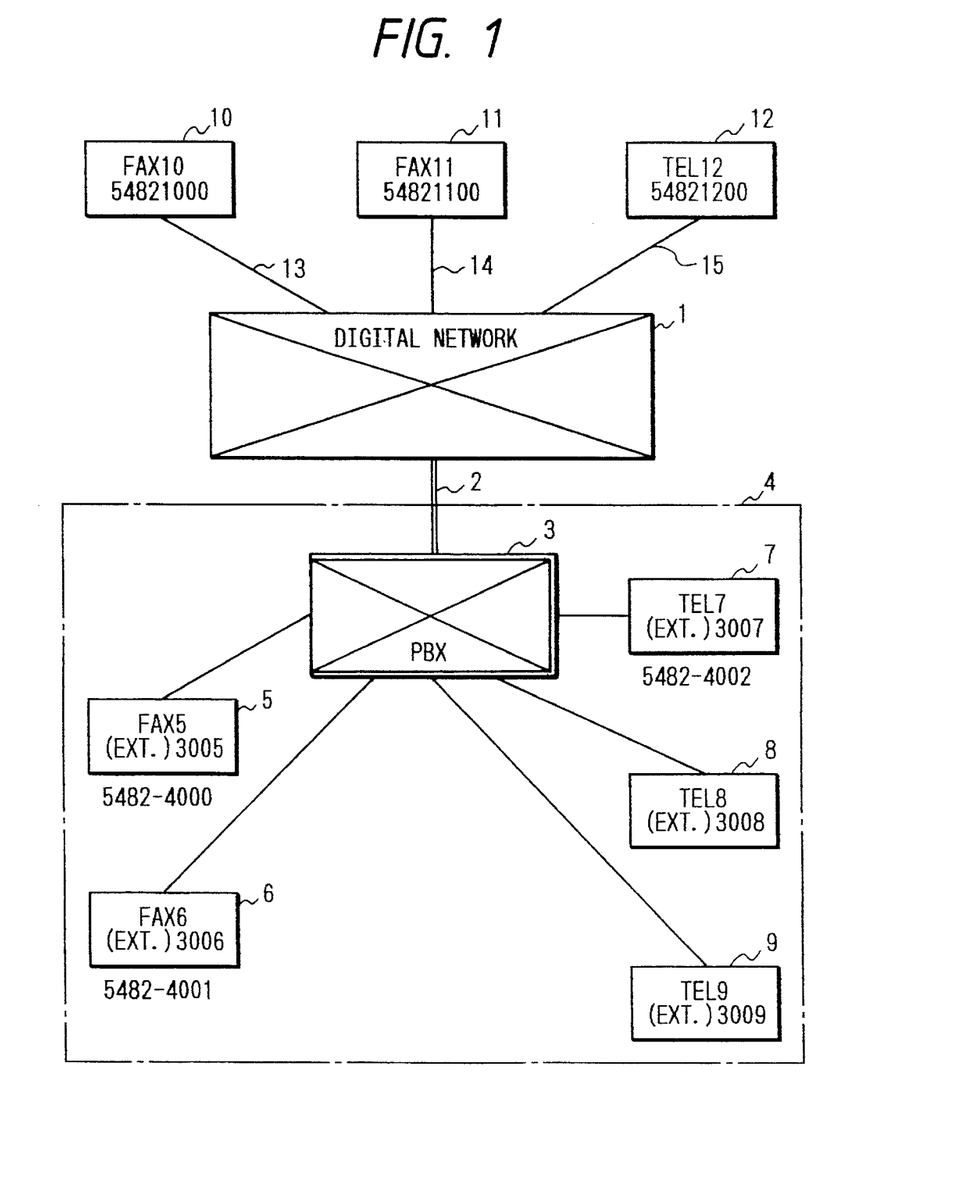
FIG. 1 is a block diagram showing a connecting state of a communication system according to an embodiment of the invention.

FIG. 1 is a schematic diagram showing a connecting state of a communication system having facsimile apparatuses and telephones according to an embodiment of the invention.

A digital network 1 is an integrated service digital network and lines 2, 13, 14, and 15 are subscriber's lines of the digital network 1, respectively.

A PBX 3 is a private branch exchange connected to the subscriber's line 2 and forms a private branch exchange network 4. G4 facsimile apparatuses 5 and 6 are connected to the PBX 3. Digital telephones 7, 8, and 9 are also similarly connected to the PBX 3.

G4 facsimile apparatuses 10 and 11 are connected to the ISDN subscriber's lines 13 and 14. A digital telephone 12 is connected to the ISDN subscriber's line 15.

Subscriber's numbers are respectively allocated to the subscriber's lines 13, 14, and 15 at the time of digital network contract and are registered as terminal information into the terminals, respectively.

In the embodiment, the subscriber's line 2 makes a direct inward dialing number contract and reception calls are allocated to three subscriber's numbers. In the case where each subscriber's number is called by the function of the PBX 3, calls are allocated to the facsimile apparatuses 5 and 6 and the telephone 7.

In the PBX network 4, the communication among the extensions can be performed and the extension number is allocated to each of the terminals which are connected to the PBX 3. The subscriber's numbers and the extension numbers which are used in the description of the embodiment are shown in blocks in FIG. 1, respectively.

In the case where each terminal in the PBX network adds the external line transmission number and performs a call in order to execute an external line call, the PBX 3 eliminates the external line transmission number and performs a call to the ISDN network. That is, in the case where the facsimile apparatus 5 performs a call to the facsimile apparatus 10 of the external line, the external line transmission number (it is now assumed that the 0 transmission is performed in the embodiment) is added and the numbers "054821000" are inputted. The PBX 3 subsequently eliminates the external line transmission number to thereby obtain "54821000" and performs a call to the digital network 1.

In the case where the facsimile apparatus 5 performs a call to the facsimile apparatus 6 of the extension, it is sufficient to input the extension numbers "3006".

Figure 2:
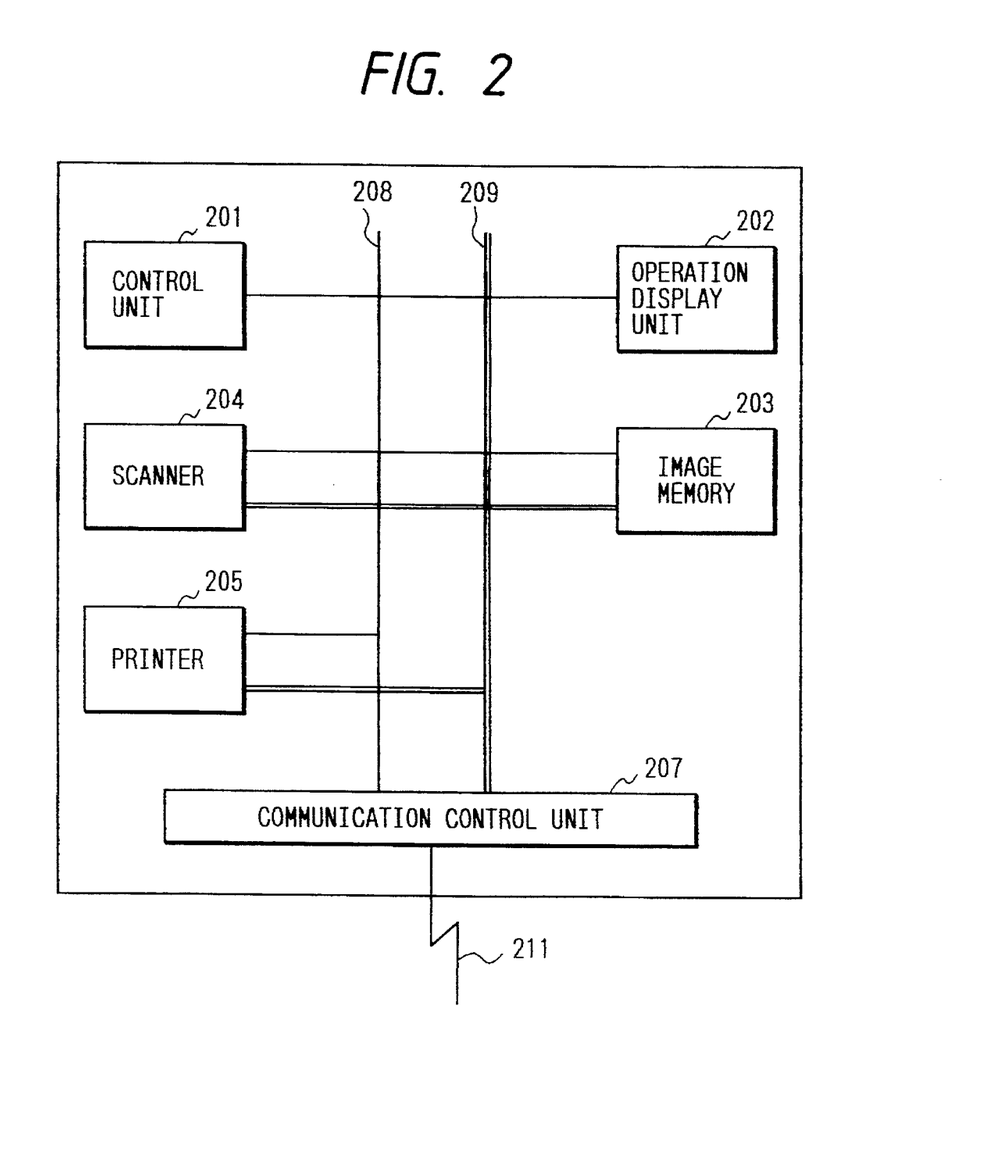
FIG. 2 is a block diagram showing a construction of a facsimile apparatus in the embodiment.

FIG. 2 is a block diagram showing constructions of the facsimile apparatuses 5 and 6 in the embodiment.

A control unit 201 comprises a CPU, an ROM, an RAM, and the like and controls the whole apparatus. An operation display unit 202 has a KEY, an LCD, an LED, or the like. An image memory 203 stores a transmission/reception image.

An image scanner 204 is an image input unit. A printer 205 is an image output unit. A communication control unit 207 is connected to a line 211 and executes a call generation/reception control (Dch control), a G4/G3 communication control (Bch control), and the like.

A control bus 208 is a bus to control each block by the control unit 201. A video bus 209 is a bus to handle image data.

Figure 3:
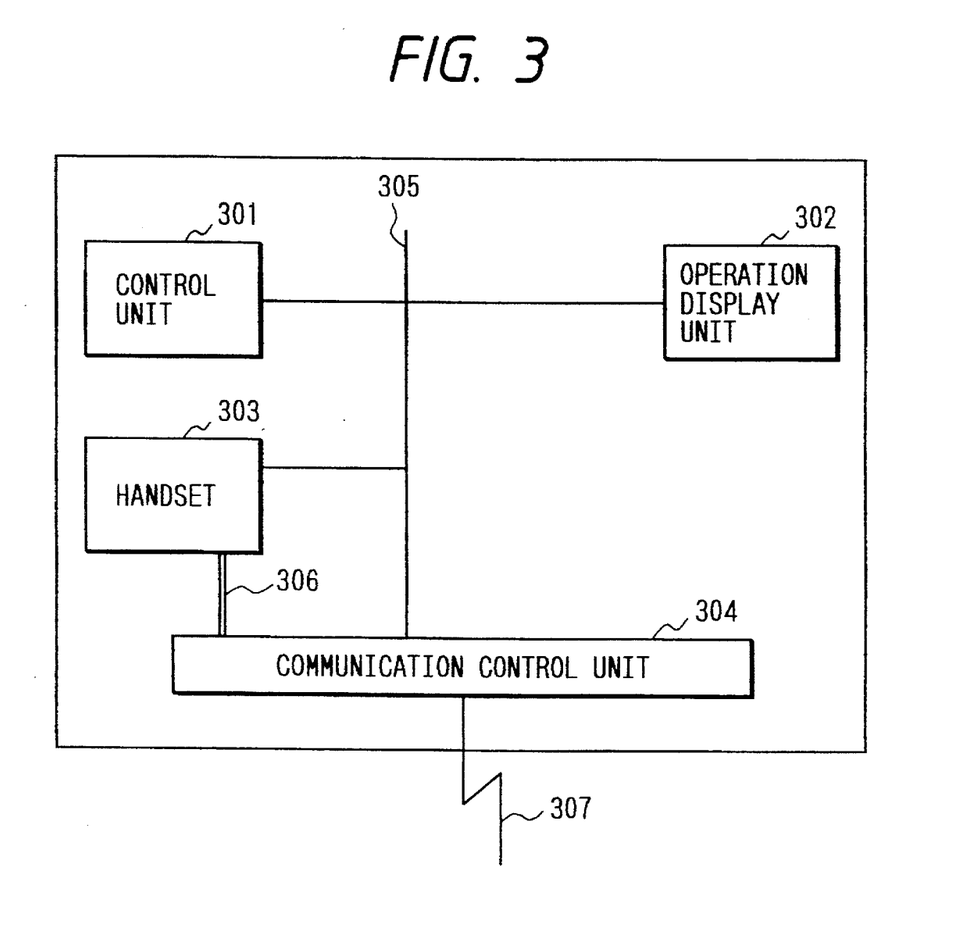
FIG. 3 is a block diagram showing a construction of a telephone in the embodiment.

FIG. 3 is a block diagram showing constructions of the digital telephones 7 to 9 in the embodiment.

A control unit 301 comprises a CPU, an ROM, an RAM, and the like and controls the whole telephone. An operation display unit 302 has a KEY, an LCD, an LED, or the like.

A handset 303 has a transmitter and a receiver. A communication control section 304 is connected to a line 307 and executes a call generation/reception control (Dch control), an audio communication control (Bch control), and the like.

A control bus 305 is a bus for the control unit 301 to control each block. An audio bus 306 is a bus to transmit or receive an audio signal.

Figure 4:
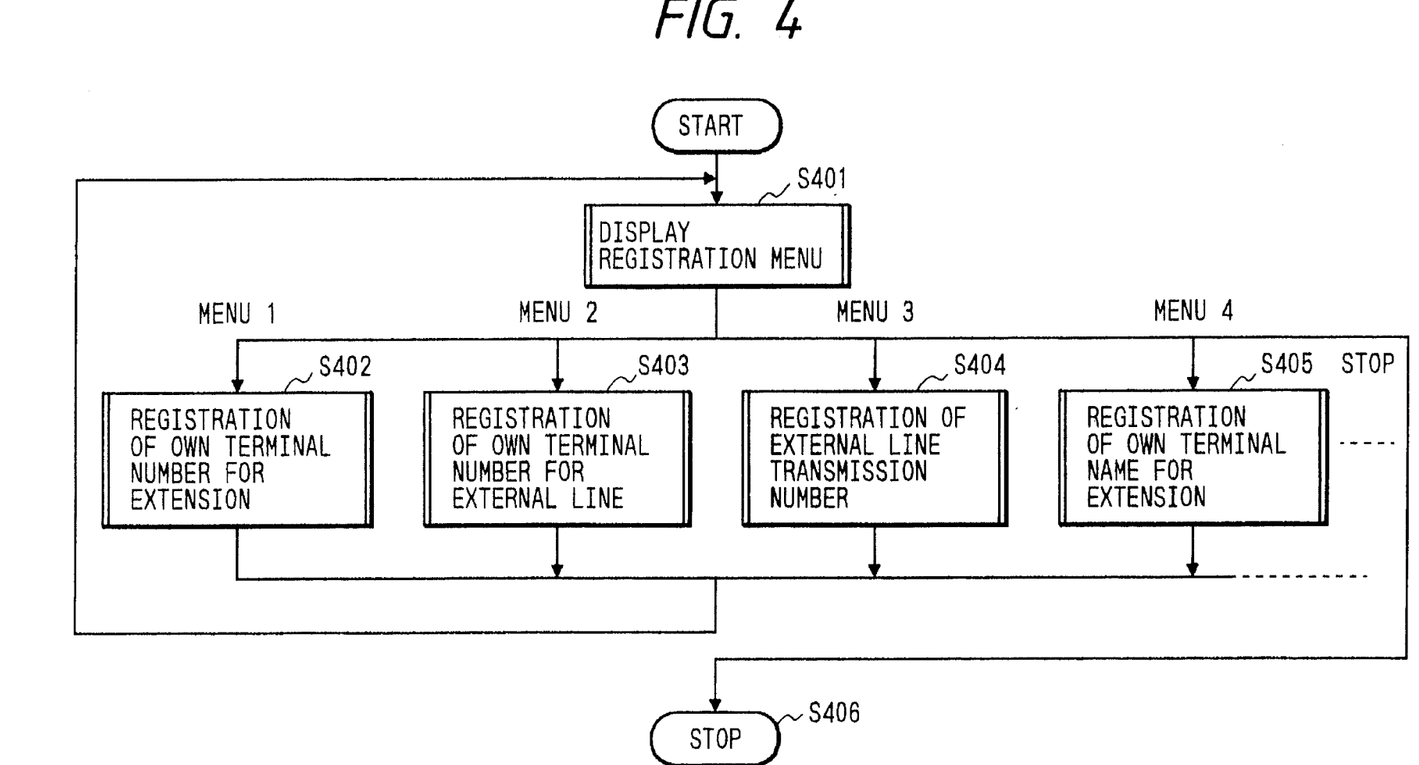
FIG. 4 is a flowchart showing the operation when registering data that is peculiar to a terminal in the above embodiment.

FIG. 4 is a flowchart showing the operations of the control units 201 and 301 when the data that is peculiar to the terminal is registered in the facsimile apparatuses 5 and 6 and telephones 7 to 9 in the embodiment.

First, by depressing terminal data registration keys of the operation display units 202 and 302 (step S401), a registration menu is displayed in each of the operation display units 202 and 302. By selecting the menu 1 (S402), a process to register the own terminal number for extension is started. In the processing routine, for example, in case of the facsimile apparatus 5, "3005" is inputted and a set key is depressed, so that those numbers are stored into a memory area of the own terminal number for extension in the RAM in the control unit. A menu display screen (S401) is again displayed.

By selecting another menu, the own terminal number for external line (S403), the external line transmission name (S404), the own terminal name for extension (S405), the own terminal number for external line, or the like can be similarly registered.

By depressing a stop key on the menu screen, a terminal data registering mode is stopped (S406) and a standby screen is displayed.

Figure 5:
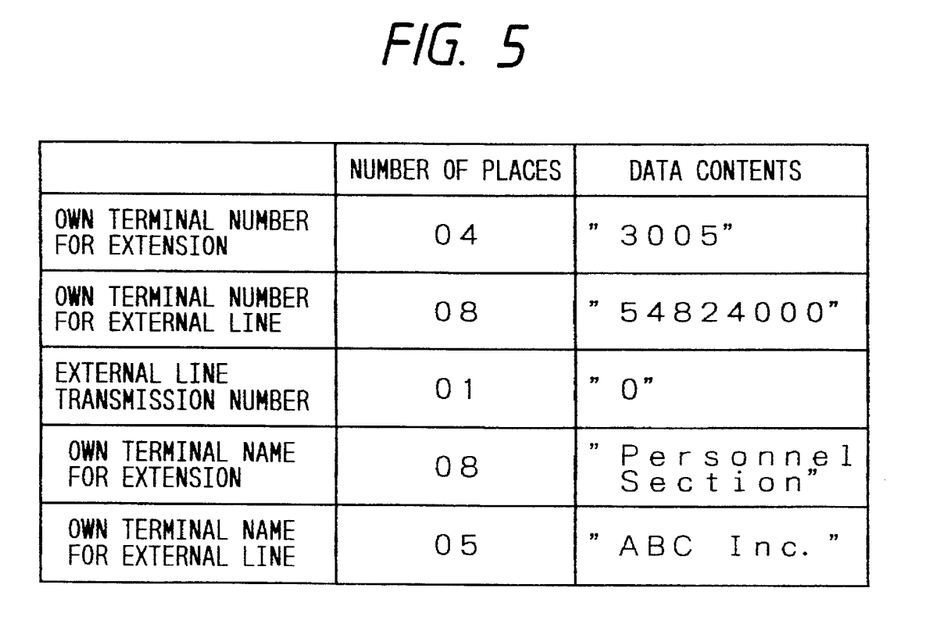
FIG. 5 is a schematic diagram showing an example of registration data in the embodiment.
Figure 6:
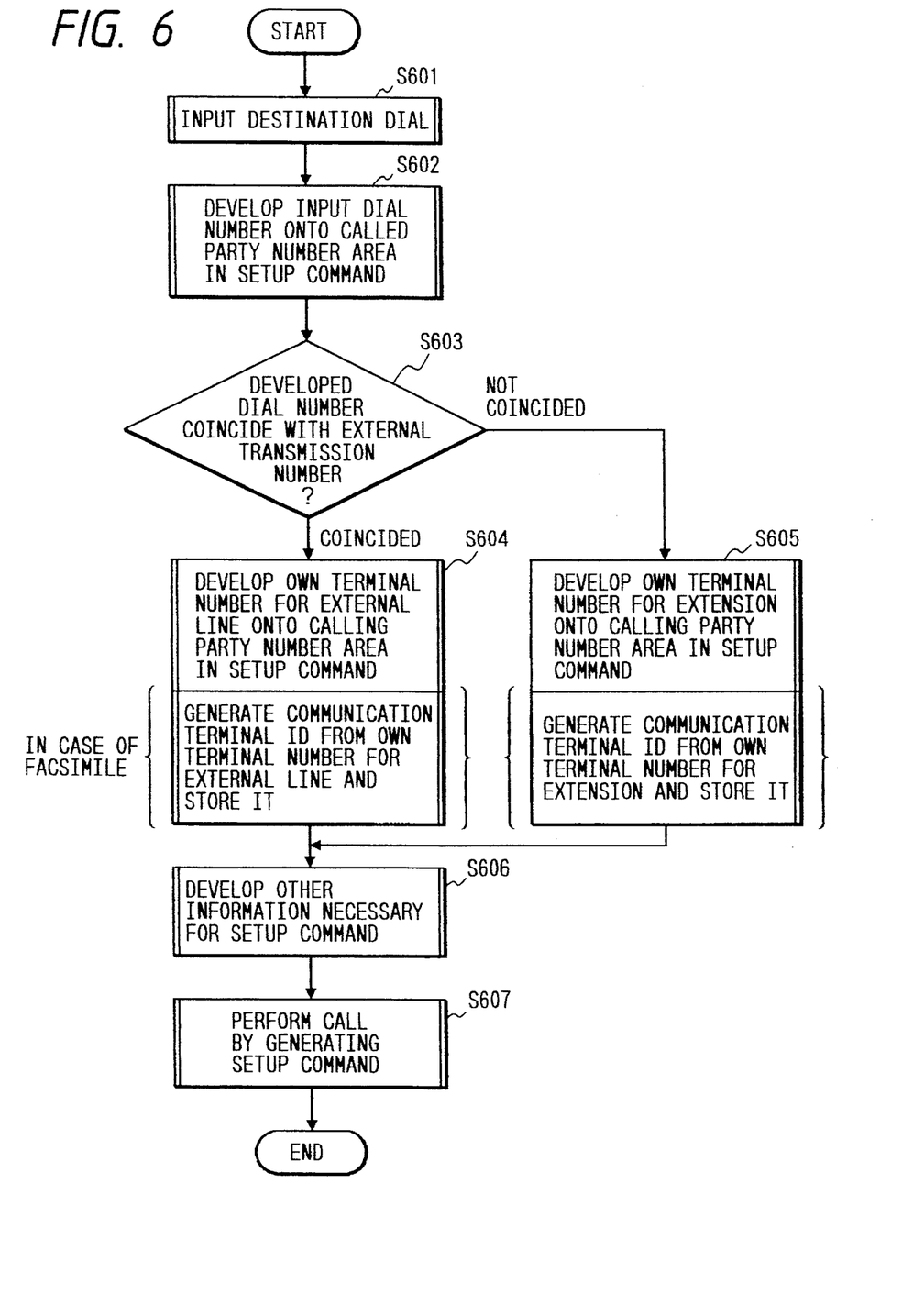
FIG. 6 is a flowchart showing the operation in case of performing a call from a facsimile apparatus or a telephone in the embodiment.

FIG. 5 is a schematic diagram showing an example of registration data in case of the facsimile apparatus 5. FIG. 6 is a flowchart showing the operations of the control units 201 and 301 in case of calling by the facsimile apparatuses 5 and 6 and the telephones 7 to 9 in the embodiment.

When a call is performed to a perform a communication or a speech communication, dialing numbers of the destination are inputted from the operation display units 202 and 302 in step S601. The dialing operation in this case includes the one-touch dialing operation, abbreviation dialing operation, dialing operation using ten-keys, or the like. In step S602, the inputted dialing numbers are developed into the called party number area of an SETUP command. In step S603, further, a check is made to see if the external line transmission number "0" shown in FIG. 5 coincides with the data in the called party number area by an amount of the number of digits ("one digit") of the external line transmission number from the head or not.

When they coincide, it is determined that the relevant call is a call to the external line. In step S604, the own terminal numbers for external line "54824000" shown in FIG. 5 are developed in a calling party number area of the SETUP command. In case of the facsimile apparatus, on the other hand, a communication terminal ID (G4: TID, G3: TSI) which is used during communication is formed from the own terminal numbers for external line "54824000", own terminal abbreviation for external line "ABC Inc", etc. and is stored into a work area that is used at the time of communication.

In step S603, when the data doesn't coincide with the external line transmission number, it is determined that the relevant call is a call to the external terminal. In step S605, the own terminal numbers "3005" for extension shown in FIG. 5 are developed into the calling party area of the SETUP command. In case of the facsimile apparatus, the communication terminal ID (G4: TID, G3: TSI) which is used during the communication is formed from the own terminal numbers for extension "3005", own terminal abbreviation for extension "Personnel Section", or the like and stored into the work area that is used at the time of communication.

In step S606, the other information (BC, HLC, etc.) necessary upon calling are developed into the area of the SETUP command. The SETUP command is sent through the communication control units 207 and 304 in step S607 by using the information developed in steps S604, S605, and S606 and a call is performed.

Therefore, when the facsimile apparatus 5 performs a call to the facsimile apparatus 10, the destination dialing numbers "054821000" are inputted. Since the result of the comparison with the external line transmission number "0" shown in FIG. 5 indicates the "coincidence", the transmission numbers for external line "54824000" in FIG. 5 are set into the calling party number information elements of the SETUP command and a call is performed. Further, on a communicating procedure, TID"081-54824000=ABC Inc." (G4) which is formed from the own terminal number for external line and the own terminal name for external line shown in FIG. 5 is transmitted to the partner apparatus. "081" in the above data denotes the country number of Japan.

When the facsimile apparatus 5 performs a call to the facsimile apparatus 6, the destination dialing numbers "3006" are inputted. Since the result of the comparison with the external line transmission number "0" shown in FIG. 5 indicates "incoincidence", the transmission numbers for extension "3005" in FIG. 5 are set into the calling party number information elements of the SETUP command and a call is performed. Further, on the communicating procedure, TID"081-3005=Personnel Section" (G4) which is formed from the own terminal number for extension and own terminal name for extension shown in FIG. 5 is notified to the partner apparatus.

Figure 7:
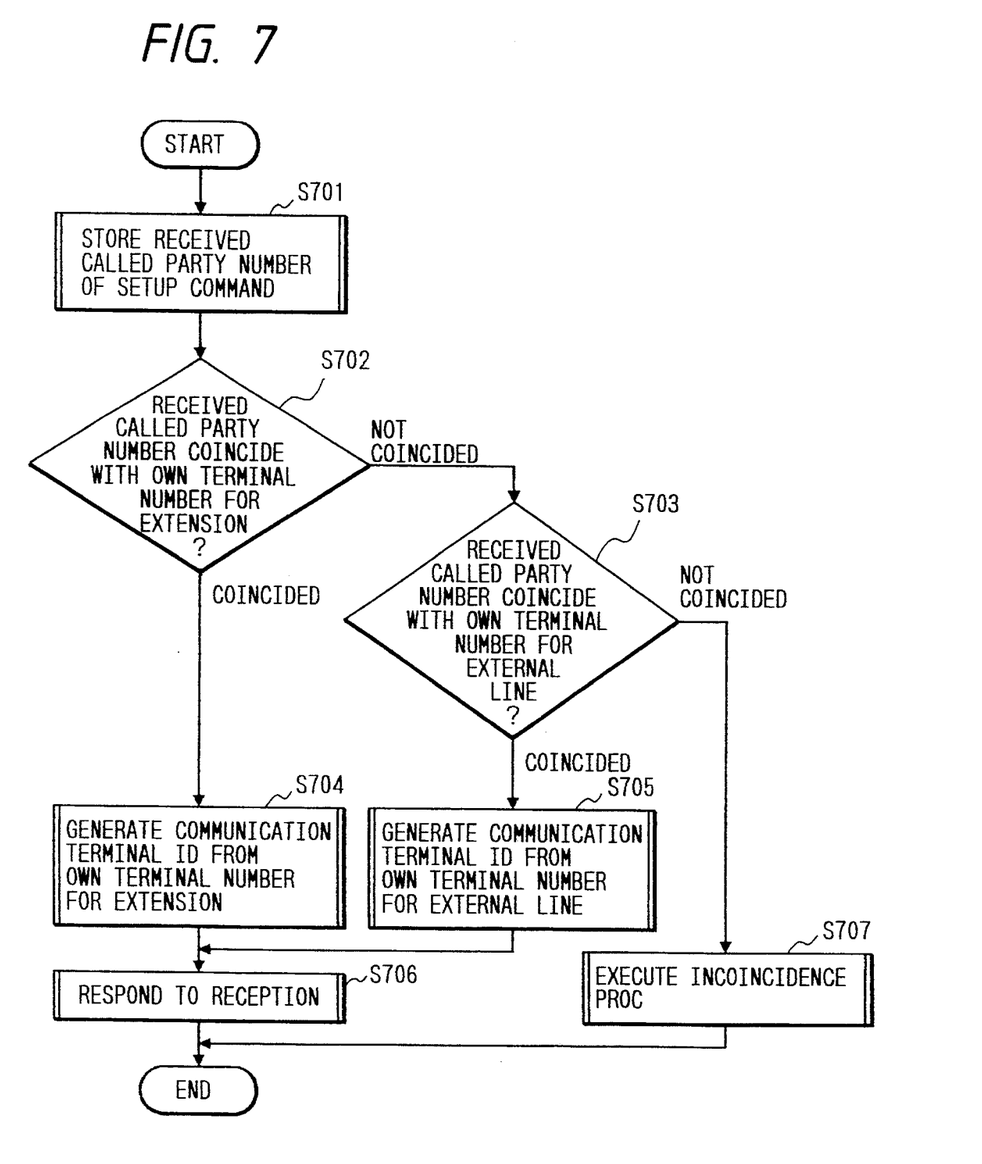
FIG. 7 is a flowchart showing the operation when the facsimile apparatus receives a call in the embodiment.

FIG. 7 is a flowchart showing the operation of the control unit 201 when the facsimile apparatus is called in the embodiment.

When the call reception is discriminated by the reception of the SETUP command, first, in step S701, the called party number information elements in the received SETUP command and developed into the work area.

In step S702, the called party number received is compared with the own terminal number for extension shown in FIG. 5. When they coincide, it is determined that the call was received from the terminal on the extension, so that step S704 follows. When they differ, in step S703, the called party number is similarly compared with the own terminal number for external line. When they coincide, it is decided that the call was received from the terminal on the external line, so that step S705 follows. When they differ in step S703, the call reception is refused or ignored in step S707.

In step S704, the communication terminal ID (TID) which is used upon communication (B channel) is formed from the own terminal number "3005" for extension and the own terminal name "Personnel Section" for extension and stored into the work area for communication. Similarly, in step S705, the communication terminal ID (TID) which is used upon communication (B channel) is formed from the own terminal number "54824000" for external line and the own terminal name "ABC Inc." for external line and stored into the work area for communication.

In step S706, by sending a CONN message, the apparatus responds to the call and, after that, executes a Bch communicating procedure at the time of response to the call. On the communicating procedure, the communication terminal ID which was formed and stored in step S704 or S705 is used.

Figure 8:
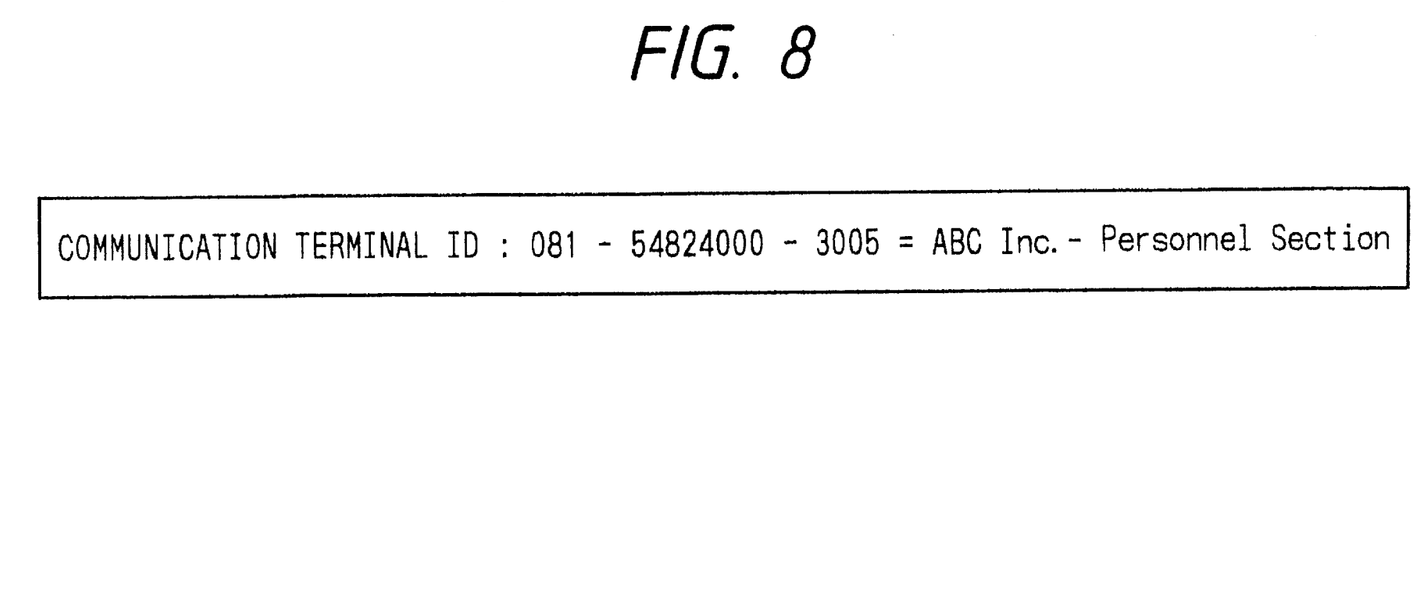
FIG. 8 is a schematic diagram showing communication terminal information formed from terminal information of both of the extension and the external line in another embodiment.

As another embodiment of the invention, the communication terminal information (G4: ITD, G3: TSI, etc.) which is used on the communicating procedure (B channel procedure) uses the data synthesized from both of the own terminal information for extension and the own terminal information for external line irrespective of the extension communication or external line communication, thereby also enabling a confusion of the communication partner user to be prevented. FIG. 8 shows an example of a synthesis of the communication terminal information by the data in FIG. 5.

The invention is not limited to the G4 facsimile and digital telephone but can be also applied to a G3 facsimile.

Although the preferred embodiments of the invention have been described above, the invention is not limited to the foregoing embodiments but many modifications and variations are possible within the spirit and scope of the appended claims of the invention.

What is claimed is:

1. A communication apparatus connected to an extension line of a private network which is connected in turn to an external line of a public network, comprising:

input means for judging whether the communication request is sent to an extension terminal of the private network or to the external line through the private network;

selecting means for selecting either terminal name information for the private network or terminal name information for the public network in accordance with a judgment by said input means; and transmitting means for transmitting to the extension line a protocol signal including terminal name information selected by said selecting means.

2. An apparatus according to claim 1, wherein the protocol signal is a SETUP command including a calling party number.

3. An apparatus according to claim 1, wherein the protocol signal is a procedure signal relating to a G4 facsimile communication.

4. An apparatus according to claim 1, wherein said input means judges whether or not the communication request includes a number specifying the external line.

5. A communication apparatus for performing a communication through a communication line with first and second networks, comprising:

receiving means for receiving a first signal including digital terminal information from the communication line;

discriminating means for discriminating whether the first signal has been sent from the first network or the second network in accordance with the digital terminal information of the first signal; and transmitting means for transmitting a second signal including digital terminal information in accordance with a discrimination by said discriminating means, wherein the terminal information of the second signal includes a terminal number and terminal name information for the first network or a terminal number and terminal name information for the second network.

6. An apparatus according to claim 5, wherein the first signal is a SETUP command including a called party number.

7. An apparatus according to claim 5, wherein the first network is a private network and the second network is a public network.

8. A terminal information switching method for switching communication apparatus connected to an extension line of a private network which is connected in turn to an external line of a public network, comprising the steps of:

inputting a communication request to the extension line;

judging whether the communication request is sent to an extension terminal of the private network or to the external line through the private network;

selecting either terminal name information for the private network or terminal name information for the public network in accordance with a judgment in said judging step; and transmitting a protocol signal including the selected terminal name information to the extension line.

9. A method apparatus according to claim 8, wherein the protocol signal is a SETUP command including a calling party number.

10. An apparatus according to claim 8, wherein the protocol signal is a procedure signal relating to a G4 facsimile communication.

11. An apparatus according to claim 8, wherein said input means judges whether or not the communication request includes a number specifying the external line.

12. A method operative in a communication apparatus for performing a communication through a communication line with first and second networks, comprising the steps of:

receiving a first signal including digital terminal information from the communication line;

discriminating whether the first signal has been sent from the first network or the second network in accordance with the digital terminal information of the first signal; and transmitting a second signal including digital terminal information in accordance with a discrimination in said discriminating step, wherein the digital terminal information of the second signal includes a terminal number and terminal name information for the first network or a terminal number and terminal name information for the second network.

13. A method according to claim 12, wherein the first signal is a SETUP command including a called party number.

14. A method according to claim 12, wherein the first network is a private network and the second network is a public network.

* * * * *

UNITED STATES PATENT AND TRADEMARK OFFICE
CERTIFICATE OF CORRECTION

PATENT NO. : 5,604,795

DATED : February 18, 1997

INVENTORS : TOSHIAKI SAITO

It is certified that error appears in the above-identified patent and that said Letters Patent is hereby corrected as shown below:

ON TITLE PAGE, item

[56] FOREIGN PATENT DOCUMENTS

"5276348  10/1993 Japan" should read --5-276348  10/1993 Japan--.

COLUMN 6

Line 34, "apparatus" should be deleted;
Line 37, "An apparatus" should read --A method--;
Line 40, "An apparatus" should read --A method--.

Signed and Sealed this

Seventeenth Day of November, 1998

Attest:

BRUCE LEHMAN

*Attesting Officer*          *Commissioner of Patents and Trademarks*